United States Patent
Palmer

(10) Patent No.: US 10,725,930 B2
(45) Date of Patent: Jul. 28, 2020

(54) LOGICAL TO PHYSICAL MEMORY ADDRESS MAPPING TREE

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 19 days.

(21) Appl. No.: 16/113,014

(22) Filed: Aug. 27, 2018

(65) Prior Publication Data

US 2020/0065256 A1 Feb. 27, 2020

(51) Int. Cl.
*G06F 12/10* (2016.01)
*G06F 16/22* (2019.01)

(52) U.S. Cl.
CPC .......... *G06F 12/10* (2013.01); *G06F 16/2246* (2019.01); *G06F 2212/202* (2013.01)

(58) Field of Classification Search
CPC ............. G06F 16/2228; G06F 16/2246; G06F 12/10–1036
See application file for complete search history.

(56) References Cited

U.S. PATENT DOCUMENTS

| | | | | |
|---|---|---|---|---|
| 5,835,964 A * | 11/1998 | Draves | ................ | G06F 12/1036 711/207 |
| 7,330,958 B2 * | 2/2008 | Davis | .................. | G06F 12/1018 711/203 |
| 8,019,945 B2 * | 9/2011 | Revanuru | ........... | G06F 12/0842 711/118 |
| 8,495,280 B2 * | 7/2013 | Kang | .................. | G06F 12/0246 711/103 |
| 8,825,937 B2 * | 9/2014 | Atkisson | ............. | G06F 12/0246 711/102 |
| 9,418,014 B2 * | 8/2016 | Kobashi | ................ | G06F 3/0611 |
| 9,558,297 B1 * | 1/2017 | Bailey | .................. | G06F 12/023 |
| 9,690,694 B2 * | 6/2017 | Nellans | ............... | G06F 12/0246 |

(Continued)

OTHER PUBLICATIONS

Ban et al. JBoss Cache TreeCache—A Tree Structured Replicated Transactional Cache, Jul. 2006. https://docs.jboss.org/jbcache/1.2.4/TreeCache/html/ (Year: 2006).*

*Primary Examiner* — Khoa D Doan
(74) *Attorney, Agent, or Firm* — Schwegman Lundberg & Woessner, P.A.

(57) ABSTRACT

Aspects of the present disclosure configure a memory sub-system to map logical memory addresses to physical memory addresses using a tree data structure in the memory sub-system. For example, a memory sub-system controller of the memory sub-system can generate a tree data structure on cache memory to cache, from non-volatile memory, at least one portion of mapping data, where the non-volatile memory is implemented by a set of memory components separate from the cache memory. The mapping data, stored on the non-volatile memory, can map a set of logical memory addresses to a corresponding set of physical memory addresses of the non-volatile memory, and a node of the tree data structure can comprise node data that describes a memory area of the non-volatile memory where data is written across a sequence of contiguous physical memory addresses.

19 Claims, 11 Drawing Sheets

(56) References Cited

U.S. PATENT DOCUMENTS

| | | | | |
|---|---|---|---|---|
| 2006/0129741 | A1* | 6/2006 | Hillier, III | G06F 12/0813 |
| | | | | 711/5 |
| 2011/0258391 | A1* | 10/2011 | Atkisson | G06F 11/108 |
| | | | | 711/118 |
| 2012/0072697 | A1* | 3/2012 | Rozas | G06F 12/1054 |
| | | | | 711/207 |
| 2012/0079174 | A1* | 3/2012 | Nellans | G06F 12/0246 |
| | | | | 711/103 |
| 2012/0089811 | A1* | 4/2012 | Sawai | G06F 12/1027 |
| | | | | 711/207 |
| 2012/0173840 | A1* | 7/2012 | Patel | G06F 13/4022 |
| | | | | 711/202 |
| 2012/0272035 | A1* | 10/2012 | Seno | G06F 13/4022 |
| | | | | 711/173 |
| 2013/0067191 | A1* | 3/2013 | Mehra | G06F 3/0605 |
| | | | | 711/173 |
| 2014/0149698 | A1* | 5/2014 | Ezra | G06F 3/0614 |
| | | | | 711/162 |
| 2014/0244935 | A1* | 8/2014 | Ezra | G06F 3/0614 |
| | | | | 711/133 |
| 2016/0092113 | A1* | 3/2016 | Veal | G06F 3/0608 |
| | | | | 711/103 |
| 2017/0024161 | A1* | 1/2017 | Katiyar | G06F 3/0647 |
| 2017/0249257 | A1* | 8/2017 | Bonnet | G06F 12/121 |
| 2019/0004941 | A1* | 1/2019 | Genshaft | G06F 12/0246 |
| 2019/0042464 | A1* | 2/2019 | Genshaft | G06F 12/1018 |
| 2019/0220416 | A1* | 7/2019 | Jung | G06F 12/1009 |

* cited by examiner

LOGICAL TO PHYSICAL MEMORY ADDRESS MAPPING TREE

TECHNICAL FIELD

Embodiments of the disclosure relate generally to memory sub-systems and more specifically, to mapping logical memory addresses to physical memory addresses using a tree in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
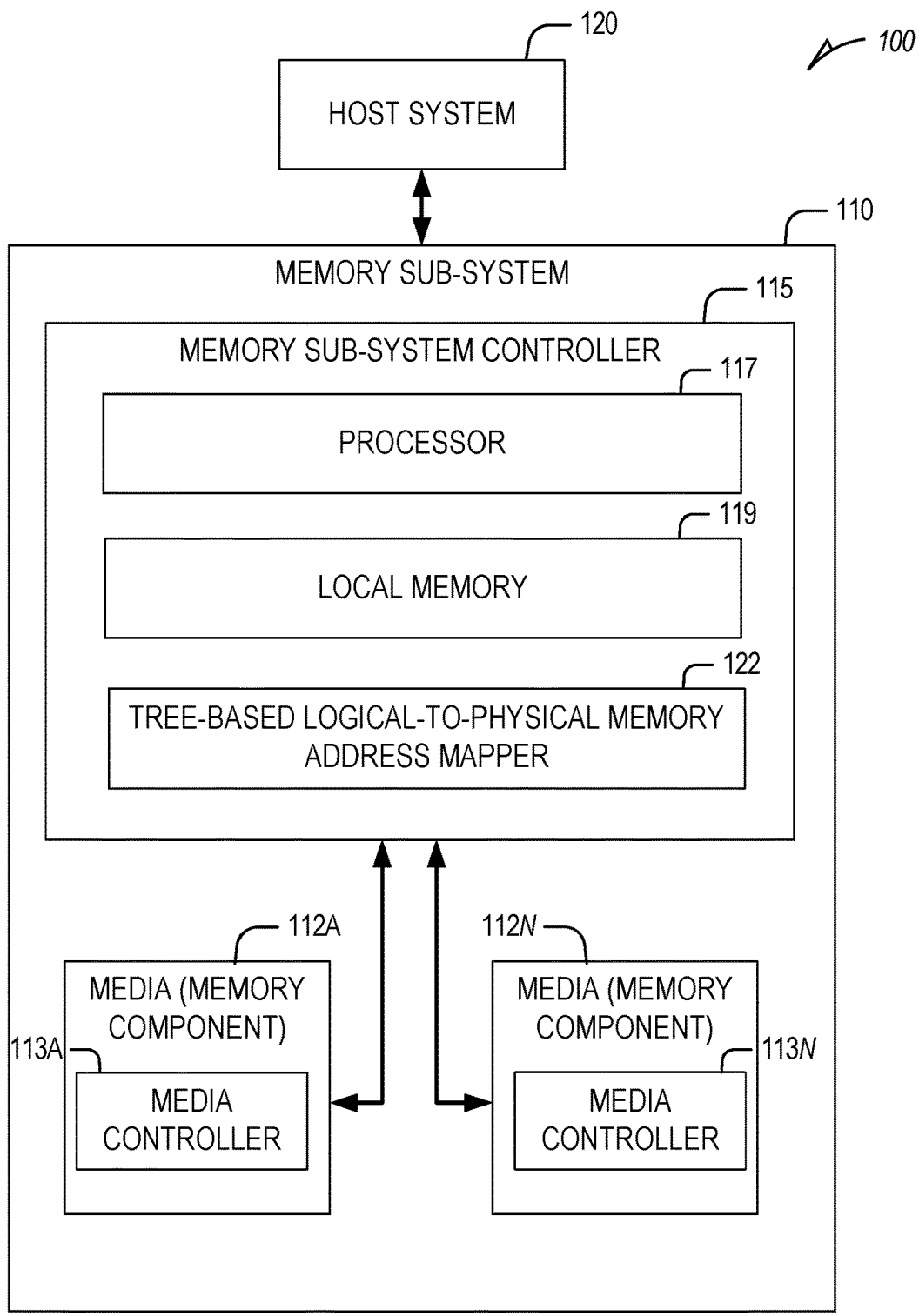
FIG. 1 is a block diagram illustrating an example computing environment including a memory sub-system, in accordance with some embodiments of the present disclosure.

Aspects of the present disclosure are directed to mapping logical memory addresses to physical memory addresses in a memory sub-system using a tree data structure. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

Traditionally, a memory sub-system controller manages a logical-to-physical memory address mapping table (e.g., L2P table mapping logical block addresses (LBAs) to physical page addresses), which is often large and usually implemented using a flat array (e.g., of physical memory addresses). The logical-to-physical memory address mapping table may be used by the memory sub-system controller when, for example, the memory sub-system controller receives a memory command from a host system and that memory command (e.g., read or write command) has at least one associated logical memory address that needs to be mapped to a corresponding physical memory addresses before the memory command can be successfully executed. Given its large size, the logical-to-physical memory address mapping table may be too large to hold in active memory (e.g., active memory of a memory sub-system controller). As such, the logical-to-physical memory address mapping table may be partitioned into a plurality of portions (e.g., data chunks), the plurality of portions may be stored on non-volatile memory (e.g., one or more NAND storage devices), and one or more of those portions may be cached (e.g., on static random-access-memory (SRAM)) for access and use by a memory sub-system controller as needed. In this way, portions of the logical-to-physical memory address mapping table may be swapped in and out of cache memory (to and from non-volatile memory) as needed. Each portion (e.g., data chunk) may comprise information for mapping a contiguous range of logical memory addresses (e.g., LBAs) to physical memory addresses. For example, a portion (e.g., chunk) of the logical-to-physical memory address mapping table may comprise 4 KB (e.g., 4096 bytes) of the logical-to-physical memory address mapping table. Where a physical memory address pointer comprises 4 bytes, a 4 KB portion may hold mapping information for 1024 contiguous logical memory addresses (e.g., LBA, LBA+1, LBA+2, LBA+3, . . . LBA+1023).

However, traditional methods (e.g., flat array of physical memory addresses) for caching portions (table portions) of a logical-to-physical memory address mapping table from non-volatile memory limit an effective range of logical memory addresses (e.g., LBAs) that is mapped by portions in the cache at a given moment, which in turn causes more cache misses when one or more portions of the table are not currently present in the cache when needed for address mapping purposes. For instance, using a traditional method, 1 MB of cache memory (e.g., SRAM) may be limited to caching table portions that map 1 GB range of logical memory addresses. Using a flat array of physical memory addresses to cache table portions is inefficient for sequentially written data because each logical memory address of the sequentially written data would have individual entry in the flat array that maps the logical memory address to a physical memory address. Likewise, using a flat array of physical memory addresses to cache table portions is inefficient for randomly written data because a random data read usually only accesses a few bytes (e.g., 4 bytes) of a table portion (e.g., data chunk) that is relatively larger (e.g., 4 KB). As a result, the table portion occupies a large amount of the cache memory relative to the amount of data of the table portion actually being read for the random data read.

Aspects of the present disclosure address the above and other deficiencies by using a tree data structure (e.g., hierarchical tree), in cache memory (e.g., SRAM), to cache one or more portions of a logical-to-physical memory address mapping table stored on non-volatile memory. The tree data structure can be used (e.g., in place of a flat array) in the cache memory to map logical memory addresses to physical memory addresses of non-volatile memory.

According to some embodiments, the memory sub-system controller constructs and updates the tree data structure, on cache memory (e.g., SRAM of the memory sub-system controller), based on one or more portions of logical-to-physical memory address mapping table stored on non-volatile memory. The memory sub-system controller can use one or more nodes of the tree data structure to map logical memory addresses to physical memory addresses of the non-volatile memory. New nodes can be added to the tree data structure as needed for mapping logical memory addresses, such as when the memory sub-system controller receives (e.g., from a host system) memory commands (e.g., read or write requests) with associated logical memory addresses that need mapping.

The tree data structure of various embodiments efficiently maps logical memory addresses to physical memory addresses to take advantage of sequentially written data on the non-volatile memory. In particular, for some embodiments, a node (e.g., leaf node) of the tree data structure describes a mapping between a single logical memory address, a single physical memory address and a count field (e.g., length field) describing the amount of sequential data written starting from the single physical memory address. For instance, where data is sequentially written on non-volatile memory (e.g., non-volatile data storage device) from the first to last logical memory address (e.g., LBA), the logical-to-physical memory address mapping can be represented by a single node of a tree data structure of an embodiment. The logical memory addresses may specify locations of blocks of data stored on the non-volatile memory, and the logical memory addresses may be used in an address space of a host system. For some embodiments, the logical memory addresses may comprise logical block addresses (LBA). The physical memory addresses may comprise physical memory addresses of a set of memory components (e.g., secondary computer store devices) that implement the non-volatile memory. For some embodiments, the physical memory addresses comprise physical page addresses (hereafter, memory pages).

The tree data structure of an embodiment can increase efficiency (e.g., maximize usage) of cache memory used (e.g., devoted) to cache mappings between logical memory addresses and physical memory addresses, which in turn can increase effective mapped logical memory address range (e.g., effective mapped LBA range) for a host system. The tree data structure of an embodiment can enable more of a host logical memory address (e.g., LBA) space to be mapped actively on cache memory, which in turn can lead to significant improvement in random and sequential read operations of non-volatile memory (e.g., data storage media) implemented by a set of memory components. For example, any sequential write (e.g., 512 KB writes) may be stored very efficiently in cache memory using a tree data structure described herein, which in turn can extend the effective range of logical memory addresses that is mapped by the cache memory. Additionally, the tree data structure of an embodiment can provide significant performance improvements for random read operations of the non-volatile memory. For instance, using a tree data structure as described herein, random reads of an entire non-volatile memory space (e.g., entire non-volatile data storage device) may result in a 100% cache hit rate in very efficient time.

Disclosed herein are some examples of memory sub-systems that perform operations relating to mapping logical memory addresses to physical memory addresses using a tree data structure.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative- or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a tree-based logical-to-physical memory address mapper 122 that can enable the memory sub-system 110 to use a tree data structure, stored on cache memory (e.g., SRAM of the memory sub-system controller 115), to cache one or more portions of logical-to-physical address mapping data (e.g., L2P table) from non-volatile memory implemented by one or more of the memory components 112A to 112N. In some embodiments, the controller 115 includes at least a portion of the tree-based logical-to-physical memory address mapper 122. For example, the controller 115 can include a processor 117 (processing device) configured to execute instructions stored in local memory 119 for performing the operations described herein. In some embodiments, the tree-based logical-to-physical memory address mapper 122 is part of the host system 120, an application, or an operating system.

For some embodiments, the cache memory storing the tree data structure used by the tree-based logical-to-physical memory address mapper 122 may be part of the memory sub-system controller 115, such as the local memory 119. Depending on the embodiment, the cache memory may comprise RAM, such as SRAM.

The tree-based logical-to-physical memory address mapper 122 can construct and update the tree data structure, on the cache memory, based on one or more portions of logical-to-physical memory address mapping table stored on non-volatile memory. The tree-based logical-to-physical memory address mapper 122 can use one or more nodes of the tree data structure to map logical memory addresses to physical memory addresses of the non-volatile memory. The tree-based logical-to-physical memory address mapper 122 can add new nodes to the tree data structure as needed for mapping logical memory addresses, such as when the memory sub-system controller 115 receives from the host system 120 memory commands (e.g., read or write commands) with associated logical memory addresses that need mapping. By using the tree data structure, the tree-based logical-to-physical memory address mapper 122 can enable the memory sub-system controller 115 to efficiently manage memory available on the cache memory for caching logical-to-physical memory address mapping data from non-volatile memory (e.g., non-volatile memory implemented by one or more of the memory components 112A to 112N).

For some embodiments, both internal nodes (e.g., non-leaf nodes) and leaf nodes of the tree data structure can represent a sequentially written area of non-volatile memory implemented by the memory components 112A to 112N. Alternatively, for some embodiments, only leaf nodes of the tree data structure can represent sequentially written areas of non-volatile memory implemented by the memory components 112A to 112N. Each internal node (e.g., non-leaf node) of the tree data structure may track the logical memory address ranges (e.g., LBA ranges) of their children nodes. A given internal node may comprise two or more child nodes. According to some embodiments, the tree data structure may limit the number of child nodes per an internal node (e.g., 8 or 16), which may permit reasonably efficient searching of the tree data structure. Such a limit may be defined, for example, at the time of manufacture of the memory sub-system 110 or time of user configuration of the memory sub-system 110. Alternatively, the tree data structure may be configured to be a binary tree, and each internal node may comprise two child nodes. When an internal node of the tree data structure needs to be split, an additional node may be added to its parent node, and this may trigger additional splits in the tree data structure. The root node of the tree data structure may be split by creating a new root node and assigning one or more child nodes resulting, from splitting the prior root node, to be the children of the new root node. For some embodiments, the tree data structure is not complete and, as such, a node (e.g., leaf node) may indicate that data is not present in the tree data structure for a given logical memory address, and a corresponding portion of logical-to-physical memory address mapping data needs to be fetched from the non-volatile memory.

Depending on the embodiment, a given node (e.g., leaf node) may represent one or more sequential written areas of the non-volatile memory. The given node may comprise data describing: a starting logical memory address (e.g., starting LBA) represented by the node; at least one starting physical memory address (e.g., starting page memory address of the non-volatile memory) mapped with respect to the starting logical memory address; and at least one count field (e.g., length field) associated with the starting physical memory address and indicating the number of physical memory addresses (starting from the starting physical memory address) to which sequential data is written on the non-volatile memory. Based on data of the given node, any logical memory address (e.g., LBA) represented by the given node can be looked up using basic math based on the starting physical address and the count field. For instance, where the given node comprises a starting logical memory address of 32, a starting physical address of 9, and a count field of 75, the given node represents a range of logical memory addresses comprising 32 to 106, and that range of logical memory addresses correspondingly maps to a range of physical memory addresses 9 to 83. For some embodiments, the given node may comprise an array for storing one or more pairs, where each pair comprises a starting physical memory address and an associated count field, thereby permitting the given node to represent more than one mapping between a range of logical memory addresses (relative to the starting logical memory) and a range of physical memory addresses. For example, the given node may comprise a starting logical memory address of 32, and an array of the given node may comprise two pairs: (9, 75) and (1, 55). For this example, the given node represents a range of logical memory addresses comprising 32 to 161, and the given node correspondingly maps logical memory addresses ranging from 32 to 106 to physical memory address ranging from 9 to 83, and correspondingly maps logical memory address ranging from 107 to 161 to physical memory address ranging from 1 to 55. More regarding this will be described herein with respect to FIGS. 7 through 9.

According to some embodiments, a node of an example tree data structure may comprise a starting logical memory address (e.g., 4-byte LBA), an array having array entries that each comprises a count value and a physical memory address (e.g., 5-byte array entries), a set of pointers (e.g., 2 bytes each pointer) to children nodes, and a pointer to a parent node (e.g., 2 bytes). For instance, where a node comprises a 4-byte starting LBA, an array of 30 5-byte array entries, a pair of 2-byte pointers to two child nodes (e.g., tree data structure is a binary tree), and a 2-byte pointer to a parent node, the node may have a size of 160 bytes.

When removing a portion (e.g., chunk) of mapping data from the tree data structure, the tree-based logical-to-physical memory address mapper 122 can search the tree data structure, from a root node, for a particular node covering the starting logical memory address associated with the portion of mapping data. Once the particular node is found, the tree-based logical-to-physical memory address mapper 122 can find all nodes in the tree data structure associated with the portion of mapping data by iterating through the nodes, from the particular node, with an in-order traversal of the tree data structure. The found nodes can then be removed from the tree data structure and, optionally, the tree data structure can be rebalanced to ensure that the tree data structure has consistent search depth. Updates to the tree data structure can involve removal of one or more nodes from the tree data structure, such as during garbage collection (as described herein) or when un-mapping a logical memory address and a physical memory address.

During a write operation, the host system 120 may provide the memory sub-system 110 with a write command having an associated logical memory address (e.g., a starting logical memory address), which represents where on the non-volatile memory (implemented by the set of memory components 112A to 112N) data will be written, and a data length, which represents how many logical memory addresses (from the associated logical memory address) data will be written to by the write command. Where the set of memory components 112A to 112N comprises NAND-type flash memory, a write command can cause data to be striped across some one or more of NAND die at a same physical memory address (e.g., same physical page address) in a defined group of data blocks (e.g., stripe data of 8 to 16 data blocks) in a manner that enables determining where data for any logical memory address in the command to be easily written based on a physical address of the first data block. If data that is to be written by a write command is causing the overwriting of a previous write command, the tree data structure may be traversed starting at the root node (of the tree data structure) to find a node (e.g., leaf node) of the tree data structure that describes a starting logical memory address (e.g., LBA) of the write command causing the overwrite. Once a node affected by a write command is found, the tree-based logical-to-physical memory address mapper 122 determines whether the write command causes at least part of the found node to be overwritten. If so, the tree-based logical-to-physical memory address mapper 122 may cause the found node to be split and a child node for the write node may be inserted under the same parent node as that of the found node. Additional node splits may be propagated through the tree data structure as a result of splitting the found node. If the data length of the write command overlaps with one or more other nodes (e.g., leaf nodes) of the tree data structure, and if those one or more other nodes are fully overwritten due to the write command, the tree-based logical-to-physical memory address mapper 122 may delete the one or more other nodes.

During a read operation, the host system 120 may provide the memory sub-system 110 with a read command having one or more associated logical memory addresses (e.g., multiple LBAs) from which data will be read from the non-volatile memory (implemented by the set of memory components 112A to 112N). Using the first logical memory address in the read command, the tree-based logical-to-physical memory address mapper 122 finds a node (e.g., leaf node) describing the first logical memory address. Subsequently, the tree-based logical-to-physical memory address mapper 122 may perform an in-order traversal of the tree data structure to find any other logical memory addresses for the read command. If all of the logical memory addresses are found in the tree data structure by the tree-based logical-to-physical memory address mapper 122, there are no cache misses and the tree-based logical-to-physical memory address mapper 122 does not need to update the tree data structure (e.g., by adding one or more new nodes or modifying one or more existing node) to provide logical-to-physical memory address mappings for the cache misses.

During garbage collection of a target data block on the non-volatile memory (implemented by the set of memory components 112A to 112N), valid data from the target data block may be copied to a new data block. Additionally, the tree-based logical-to-physical memory address mapper 122 can simplify the tree data structure by collapsing two or more nodes describing one or more logical memory addresses (e.g., LBAs) that are related to a logical memory address of the target data block being garbage collected. In particular, the tree-based logical-to-physical memory address mapper 122 may create a sequential data write on the non-volatile memory by also copying data blocks of the related logical memory addresses (e.g., LBAs) to the new data block on the non-volatile memory. For instance, if the target data block to be garbage collected has an LBA of 3, and the valid data of the target data block is copied to a new data block, the tree-based logical-to-physical memory address mapper 122 can also find LBAs 0, 1, 2, 4, 5, 6, 7, 8, 9, 10, 11, and 12 in the tree data structure, copy valid data from the data blocks associated with LBAs 0, 1, 2, 4, 5, 6, 7, 8, 9, 10, 11, and 12 (thereby creating a sequential data write), and update the tree data structure to collapse the nodes associated with LBAs 0, 1, 2, 4, 5, 6, 7, 8, 9, 10, 11, and 12 to a single node.

Figure 2:
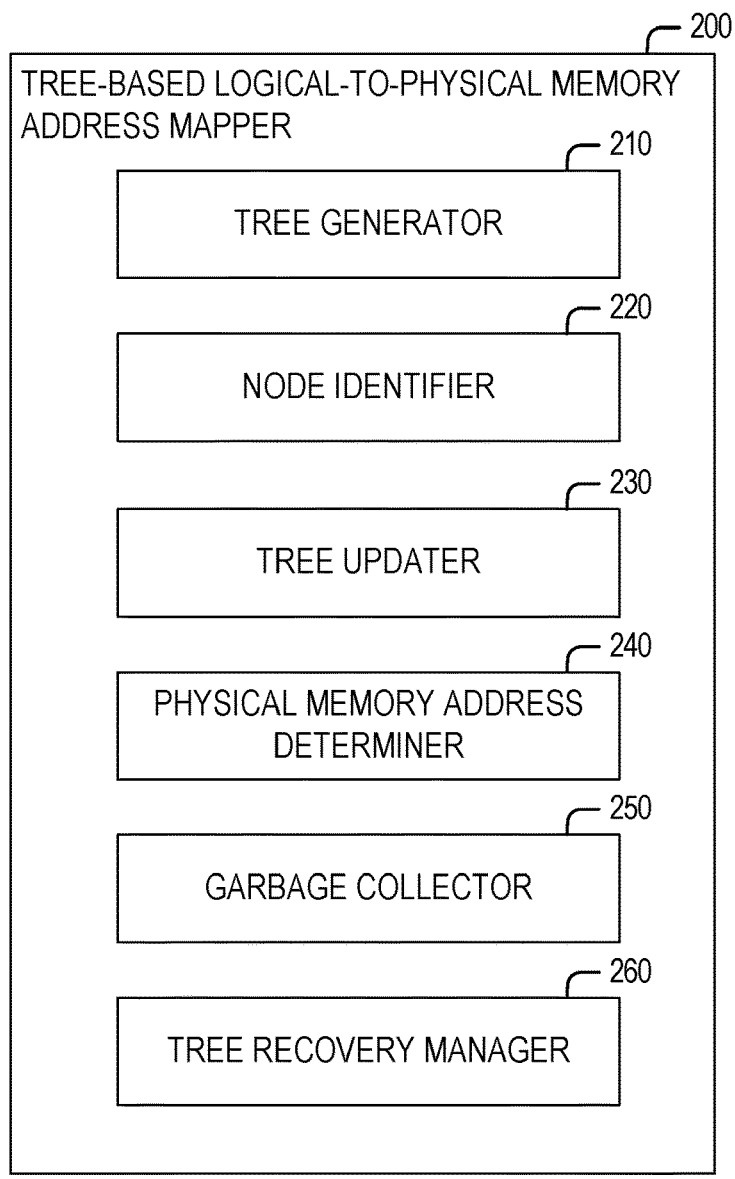
FIG. 2 is a block diagram of an example tree-based logical-to-physical memory address mapper, in accordance with some implementations of the present disclosure.

FIG. 2 is a block diagram of an example tree-based logical-to-physical memory address mapper 200, in accordance with some implementations of the present disclosure. As illustrated, the tree-based logical-to-physical memory address mapper 200 comprises a tree generator 210, a node identifier 220, a tree updater 230, a physical memory address determiner 240, a garbage collector 250, and a tree recovery manager 260. For some embodiments, the tree-based logical-to-physical memory address mapper 200 may differ in components or arrangement (e.g., less or more components) than what is illustrated in FIG. 2.

The tree generator 210 can generate a tree data structure on cache memory capable of caching, from non-volatile memory, a portion of mapping data, where the mapping data maps a set of logical memory addresses to a corresponding set of physical memory addresses of the non-volatile memory, and where the non-volatile memory is implemented by a set of memory components separate from the cache memory. A portion of the mapping data, which represents less than all the mapping data, may map a subset of logical memory addresses to a corresponding subset of physical memory addresses. A node (e.g., leaf node) of the tree data structure may comprise node data that describes a memory area of the non-volatile memory where data is written across a sequence of contiguous physical memory addresses of the non-volatile memory. For example, the node data (of the node) may comprise a starting logical memory address that is represented by the node. Additionally, the node data may comprise an array data structure that comprises (e.g., stores) at least one array entry that represents a sequence of contiguous physical memory addresses of the non-volatile memory device. For instance, the at least one array entry may comprise a starting physical memory address of the sequence of contiguous physical memory addresses, and a count value (e.g., length value) for how many contiguous physical memory addresses (starting from the starting physical memory address) are included in the sequence of contiguous physical memory addresses.

When the tree generator 210 initially generates (e.g., constructs) the tree data structure on the cache memory (e.g., during power-on of a memory sub-system), the initially-generated tree data structure may be effectively empty and comprise a single root node that does not describe any mappings between a logical memory address and a physical memory address. As one or more portions of the mapping data are loaded from the non-volatile memory (e.g., loaded to local memory of the memory sub-system controller that is separate from the cache memory) to be cached, the tree data structure may be populated with more new nodes node data. In this way, the tree data structure is constructed on-the-fly as the tree data structure is searched for nodes of interest and not those nodes are not found in the tree data structure. Alternatively, the tree generator 210 may initially generate the tree data structure by scanning the mapping data on the non-volatile memory and initially populating the tree data structure with one or more nodes that represent the largest sequential ranges of written data found in the mapping data.

The node identifier 220 can search the tree data structure for (in order to identify) a particular node of the tree data structure that comprises a mapping between a particular logical memory address and a particular physical memory address of the non-volatile memory. The particular logical memory address may represent a logical memory address of interest that is associated with a command (e.g., write or read command) received from a host system. Searching the tree data structure to find the particular node may comprise traversing the tree data structure, in order from a root node of the tree data structure, to find (identify) the particular node in the tree data structure. Where the particular node is found (identified), the identified particular node may be returned for use by the physical memory address determiner 240 to determine the particular physical memory address based on the identified particular node (e.g., the data comprised therein).

The tree updater 230 can generate one or more nodes in the tree data structure in response to a particular node not being found (identified) in the tree data structure by the node identifier 220. In particular, the tree updater 230 can load (e.g., read), from the non-volatile memory, a particular portion of the mapping data that comprises a mapping between the particular logical memory address to the particular physical memory address. The tree updater 230 can generate one or more new nodes in the tree data structure based on the loaded particular portion of the mapping data. At least one new node generated can represent the particular node being searched for by the node identifier 220 and, accordingly, once generated, the at least one new node may be returned for use by the physical memory address determiner 240 to determine the particular physical memory address based on the at least one node (e.g., the data comprised therein).

When generating one or more nodes based on a loaded portion of mapping data, the tree updater 230 can generate a new node having node data that comprises an array data structure and a starting logical memory address, where the array data structure can store pairs of physical memory addresses and count values (e.g., length values), and the start logical memory address is the first logical memory address mapped (to a physical memory address) by the new node (e.g., by any array entry of the array data structure). The tree updater 230 can iterate over a plurality of physical memory addresses stored in the loaded portion of the mapping data (e.g., 1024 4-byte physical memory addresses for a 4 KB chunk of the mapping data) to first determine a set of sequences of contiguous physical memory addresses in the plurality of physical memory addresses, and then populate one or more array entries of the array data structure (of the new node) to represent the particular sequence of contiguous physical memory addresses. The tree updater 230 can then insert the new node into the tree data structure. For some embodiments, the tree data structure can be rebalanced (e.g., after insertion of one or more nodes) to ensure consistent search depth for the tree data structure.

When generating a new node based on a loaded portion of mapping data, the tree updater 230 can determine whether an array data structure of the node ever becomes full while populating array entries of the array data structure (e.g., array having capacity for 30 entries). In response to determining that the array data structure has become full, the tree updater 230 can generate a second new node having node data that comprises a second array data structure and a second starting logical memory address represented by the second new node.

When inserting a node into a tree data structure, the tree updater 230 can insert the node into the tree data structure according to the starting logical memory address represented by (e.g., comprised by) the node, and such that after node insertion, the tree data structure adheres to the following: each left child node is associated with a logical memory address that is less than a parent node of the left node; and each right child node is associated with a logical memory address that is more than a parent node of the right node.

The physical memory address determiner 240 can determine a particular physical memory address of the non-volatile memory for a particular logical memory address based on a particular node identified by the node identifier 220 for the particular logical memory address or a particular node generated by the tree updater 230 for the particular logical memory address. Specifically, the physical memory address determiner 240 may determine the particular physical memory address for the particular logical memory address based on node data of the particular node, which as noted herein, can describe a mapping between the particular logical memory address and the particular memory address.

The garbage collector 250 can perform garbage collection on a given data block of the non-volatile memory that is associated with a given logical memory address by copying valid data from the given data block to another data block of the non-volatile memory. The garbage collector 250 can search for a set of nodes, in the tree data structure, where each node in the set of nodes is associated with a sequence of logical memory addresses that includes the given logical memory address of the given data block (being garbage collected). The garbage collector 250 can then further garbage collect one or more other data blocks associated with logical memory addresses in the sequence of logical memory addresses. Accordingly, the garbage collector 250 can copy valid data from the one or more data blocks (associated with logical memory addresses in the sequence of logical memory addresses) to the other data block—the same data block to which valid data from the given data block was copied. In doing so, the garbage collector 250 can assist in creating a sequential data write on the non-volatile memory. The garbage collector 250 can then replace the set of nodes in the tree data structure (associated with the sequence of logical memory addresses) with a single node in the tree data structure. In this way, the set of nodes can be collapsed into a single node.

The tree recovery manager 260 can copy the tree data structure from the cache memory to the non-volatile memory as at a checkpoint time to produce a copy of the tree data structure on the non-volatile memory. In this way, the tree recovery manager 260 can be persisted to the non-volatile memory at a key checkpoint time (e.g., during certain operations of the non-volatile memory, such as closing of a data block). Additionally, in this way, the tree recovery manager 260 can enable recovery of the tree data structure in the event of an unexpected power loss to a memory sub-system or a deep sleep of the memory sub-system, which may be the tree data structure being erased from the cache memory. For example, to recover the tree data structure, the tree recovery manager 260 can determine whether a memory sub-system suffered an unexpected power loss, and in response to determining that the memory sub-system suffered the unexpected power loss (e.g., at power-on of the memory sub-system), can reconstruct a version of the tree data structure on the cache memory based on the copy of the tree data structure on the non-volatile memory. Alternatively, the tree recovery manager 260 may reconstruct the tree data structure on the cache memory by scanning the mapping data on the non-volatile memory and populating the tree data structure with one or more nodes that represent the largest sequential ranges of written data found in the mapping data.

Figure 3:
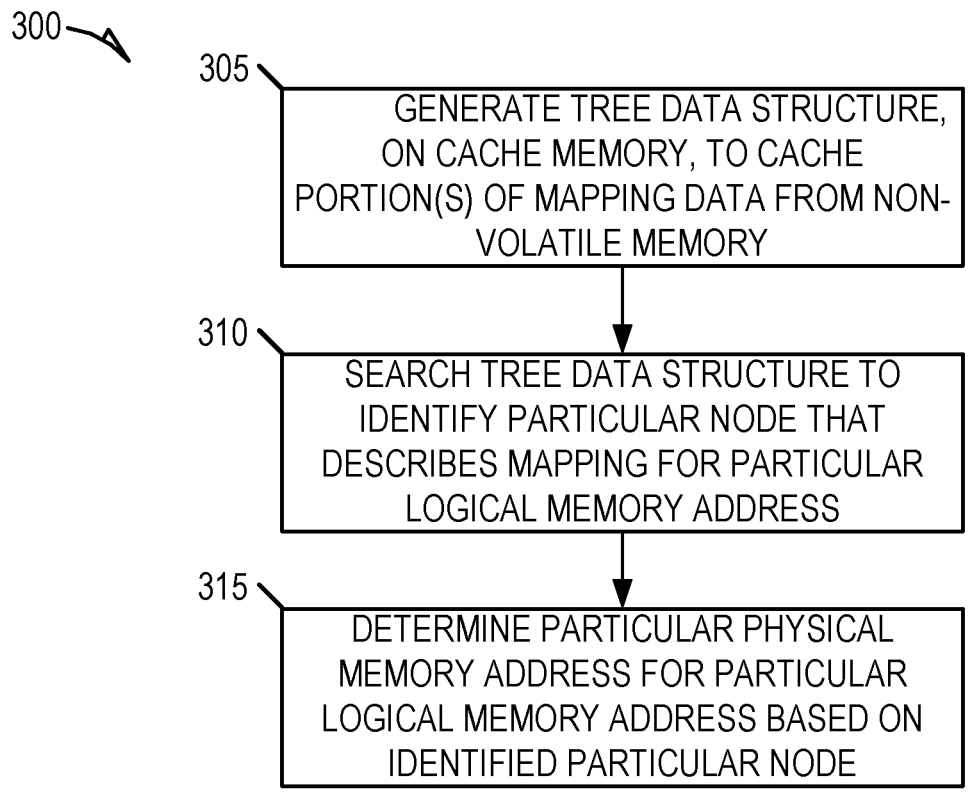
FIGS. 3 through 5 are flow diagrams of example methods for using a tree data structure for logical-to-physical memory address mapping, in accordance with some implementations of the present disclosure.
Figure 4:
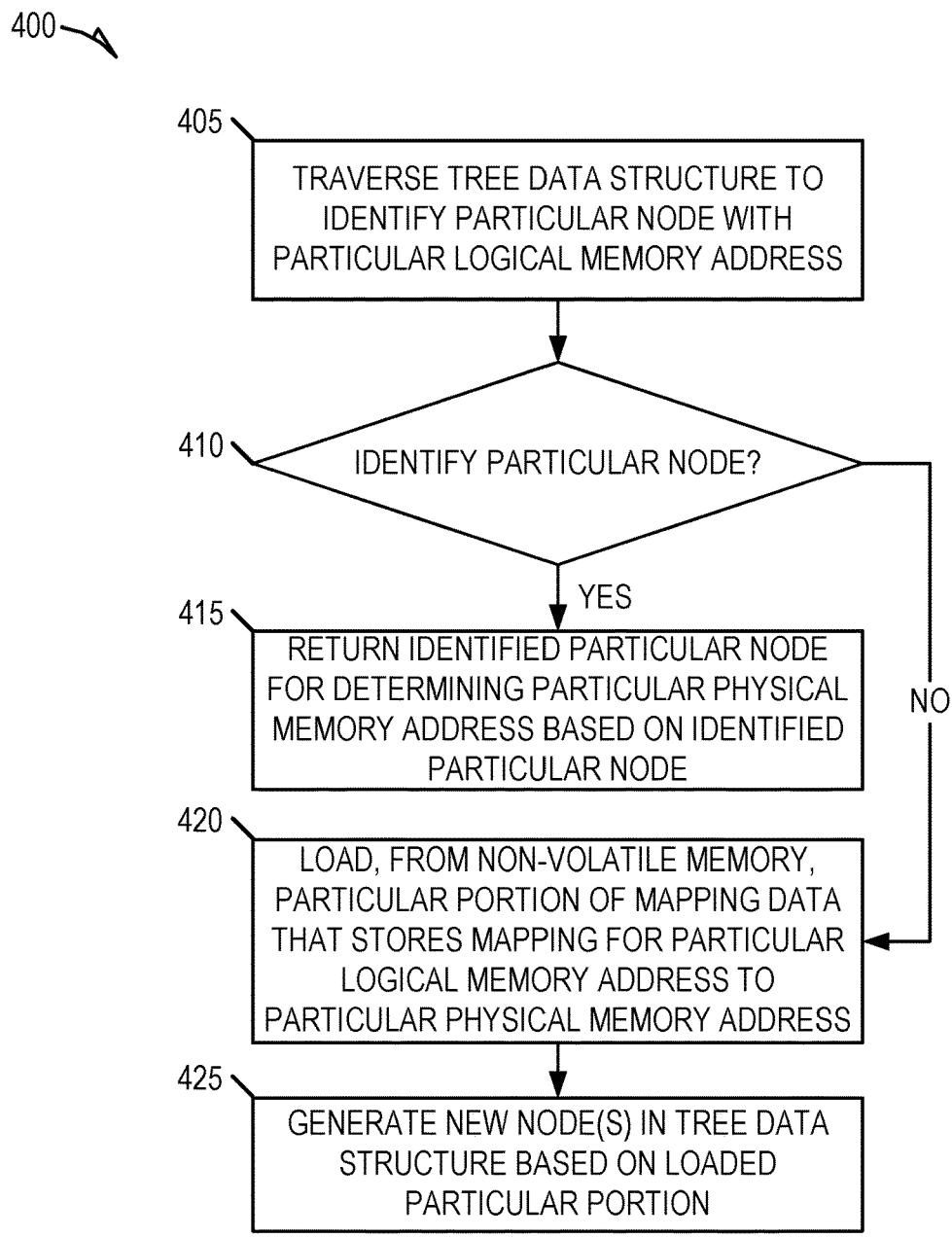
Figure 5:
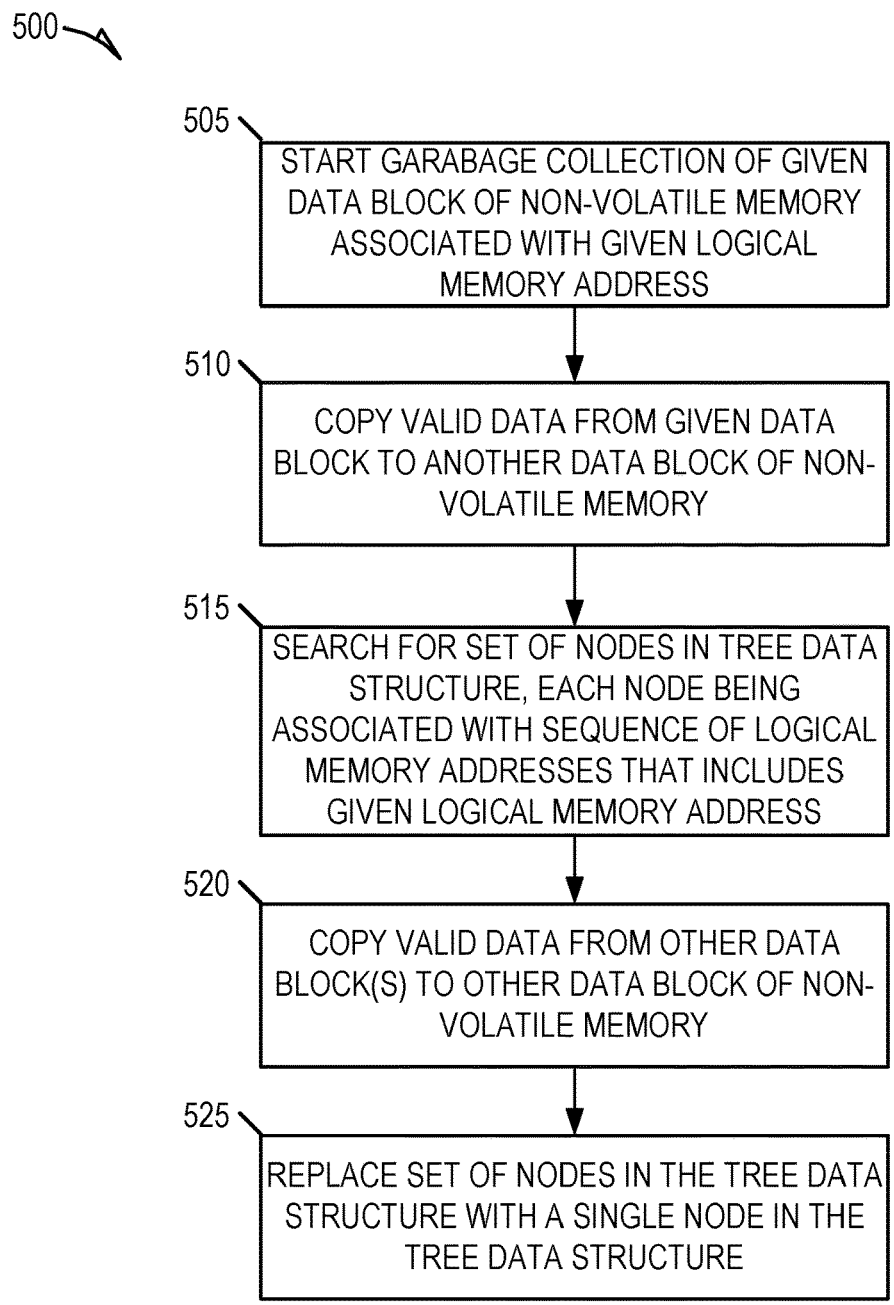

FIGS. 3 through 5 are flow diagrams of example methods for using a tree data structure for logical-to-physical memory address mapping, in accordance with some implementations of the present disclosure. Any of the example methods of FIGS. 3 to 5 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the example methods of FIGS. 3 to 5 are performed by the memory sub-system controller 115 of FIG. 1. In these embodiments, the example methods of FIGS. 3 to 5 may be performed, at least in part, by the tree-based logical-to-physical memory address mapper 122. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For some embodiments, operations of the method 300 is performed with respect to two or more (e.g., all) data blocks on a set of memory components that are open for writing (also referred to herein as open data blocks) and with respect to two or more data chunks of those two or more data blocks.

Referring now to FIG. 3, an example method 300 is illustrated for using a tree data structure to cache logical-to-physical memory address mapping data and map a logical memory address to a physical memory address, in accordance with some implementations of the present disclosure. At operation 305, a processing device of a memory sub-system (e.g., of processor of the memory sub-system controller 115) generates (e.g., initializes) a tree data structure on cache memory capable of caching, from non-volatile memory, a portion of mapping data, where the mapping data maps a set of logical memory addresses to a corresponding set of physical memory addresses of the non-volatile memory, and where the non-volatile memory is implemented by a set of memory components separate from the cache memory. Operation 305 may be performed by the processing device at (or as part of) power-on of the memory sub-system. As noted herein, a node (e.g., leaf node) of the tree data structure may comprise node data that describes a memory area of the non-volatile memory where data is written across a sequence of contiguous physical memory addresses of the non-volatile memory. For instance, the node data (of the node) may comprise a starting logical memory address that is represented by the node. Additionally, the node data may comprise an array data structure that comprises (e.g., stores) at least one array entry that represents a sequence of contiguous physical memory addresses of the non-volatile memory device. For instance, the at least one array entry may comprise a starting physical memory address of the sequence of contiguous physical memory addresses, and a count value (e.g., length value) for how many contiguous physical memory addresses (starting from the starting physical memory address) are included in the sequence of contiguous physical memory addresses.

At operation 310, the processing device of the memory sub-system searches the tree data structure for (in order to identify) a particular node of the tree data structure that comprises a mapping between a particular logical memory address and a particular physical memory address of the non-volatile memory. As noted herein, the particular logical memory address may represent a logical memory address of interest that is associated with a memory command (e.g., write or read command) received from a host system (e.g., the host system 120). Accordingly, though not shown, operation 310 may be performed in response to receiving a memory command from the host system. Additionally, searching the tree data structure to find the particular node may comprise traversing the tree data structure, in order from a root node of the tree data structure, to find (identify) the particular node in the tree data structure. Where the particular node is found (identified) by operation 310, the identified particular node may be returned for use by operation 315 to determine the particular physical memory address based on the identified particular node (e.g., the data comprised therein). Where the particular node is not found (not identified) by operation 310, one or more nodes can be generated in the tree data structure based on a particular portion of the mapping data loaded (e.g., read) from the non-volatile memory such that at least one node generated can represent the particular node being searched for by the node identifier 220. Once generated, the at least one node represents the identified particular node and may be returned for use by operation 310 to determine the particular physical memory address based on the at least one node (e.g., the data comprised therein).

At operation 315, the processing device of the memory sub-system determines a particular physical memory address of the non-volatile memory for a particular logical memory address based on a particular node identified by operation 310, which as noted herein, can describe a mapping between the particular logical memory address and the particular memory address.

Referring now to FIG. 4, an example method 400 is illustrated for searching a tree data structure for logical-to-physical memory address mapping data, in accordance with some implementations of the present disclosure. At operation 405, a processing device of a memory sub-system (e.g., of processor of the memory sub-system controller 115) traverses a tree data structure, in-order from a root node, to find (identify) a particular node associated with a particular logical memory address (e.g., target logical memory address). At operation 410, if the particular node is found (identified), the method 400 proceeds to operation 415, and if not, the method 400 proceeds to operation 420. Not finding the particular node in the tree data structure can represent a cache miss for a memory address mapping being sought by operation 405. At operation 415, the particular node identified by operation 405 is returned for use (by the processing device) to determine a particular physical memory address based on the particular node.

At operation 420, the processing device of the memory sub-system loads (e.g., reads), from non-volatile memory, a particular portion of mapping data that comprises a mapping between the particular logical memory address (being sought by operation 405) to the particular physical memory address. As noted herein, a portion of the mapping data may comprise information for mapping a contiguous range of logical memory addresses (e.g., LBAs) to physical memory addresses. For instance, a portion (e.g., chunk) of a logical-to-physical memory address mapping table may comprise 4 KB (e.g., 4096 bytes) of the logical-to-physical memory address mapping table. Where a physical memory address pointer comprises 4 bytes, a 4 KB portion may hold mapping information for 1024 contiguous logical memory addresses (e.g., LBA, LBA+1, LBA+2, LBA+3, . . . LBA+1023).

At operation 425, the processing device of the memory sub-system generates one or more new nodes in the tree data structure based on the particular portion loaded by operation 420. At least one new node generated by operation 425 can represent the particular node being searched for by operation 405. Once generated, the new node representing the particular node may be returned for use by the processing device to determine the particular physical memory address based on the particular node.

Referring now to FIG. 5, an example method 500 is illustrated for garbage collection using a tree data structure for logical-to-physical memory address mapping, in accordance with some implementations of the present disclosure. At operation 505, a processing device of a memory sub-system (e.g., of processor of the memory sub-system controller 115) starts garbage collection of a given data block of non-volatile memory associated with a given local memory address (e.g., LBA of 3). The processing device may start (e.g., initiate) the garbage collection in response to, for example, receiving a command from a host system (e.g., the host system 120) or a maintenance operation performed on the non-volatile memory. At operation 510, the processing device of the memory sub-system copies valid data from the given data block to another data block of the non-volatile memory.

At operation 515, the processing device of the memory sub-system searches for a set of nodes, in the tree data structure, where each node in the set of nodes is associated with a sequence of logical memory addresses (e.g., LBAs 0, 1, 2, 3, 4, 5, 6, 7, 8, 9, 10, 11, and 12) that includes the given logical memory address of the given data block (being garbage collected by operation 505). At operation 520, the processing device of the memory sub-system copies valid data from one or more data blocks, associated with logical memory addresses in the sequence of logical memory addresses, to the other data block—the same data block to which valid data from the given data block was copied by operation 510. In doing so, operation 520 can create a sequential data write on the non-volatile memory. At operation 525, the processing device of the memory sub-system replaces the set of nodes in the tree data structure (associated with the sequence of logical memory addresses) with a single node in the tree data structure. In this way, the set of nodes can be collapsed into a single node by operation 525.

Figure 6A:
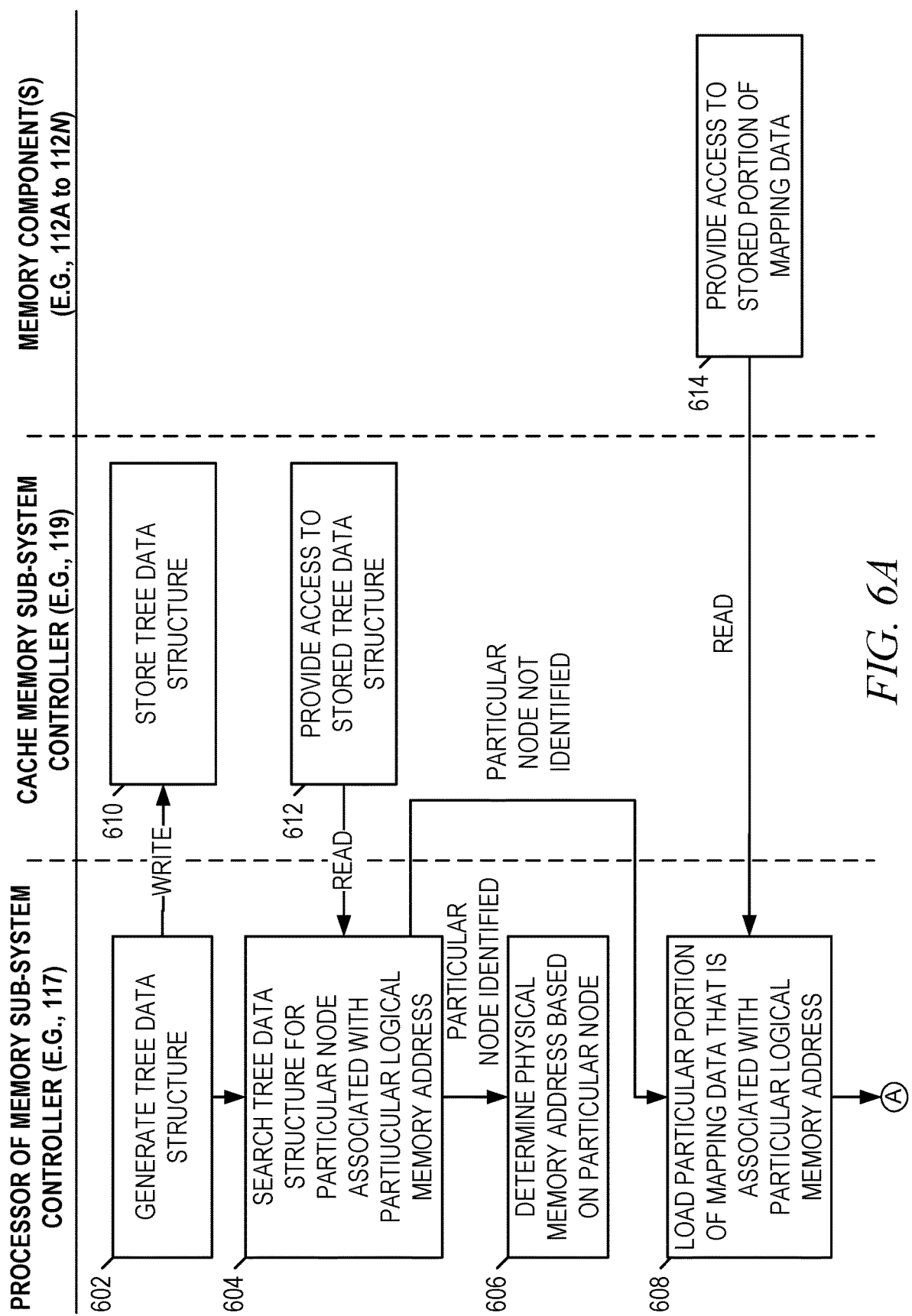
FIGS. 6A and 6B provide an interaction diagram illustrating interactions between components of a computing environment in the context of an example embodiment in which a method is used for using a tree data structure for logical-to-physical memory address mapping.
Figure 6B:
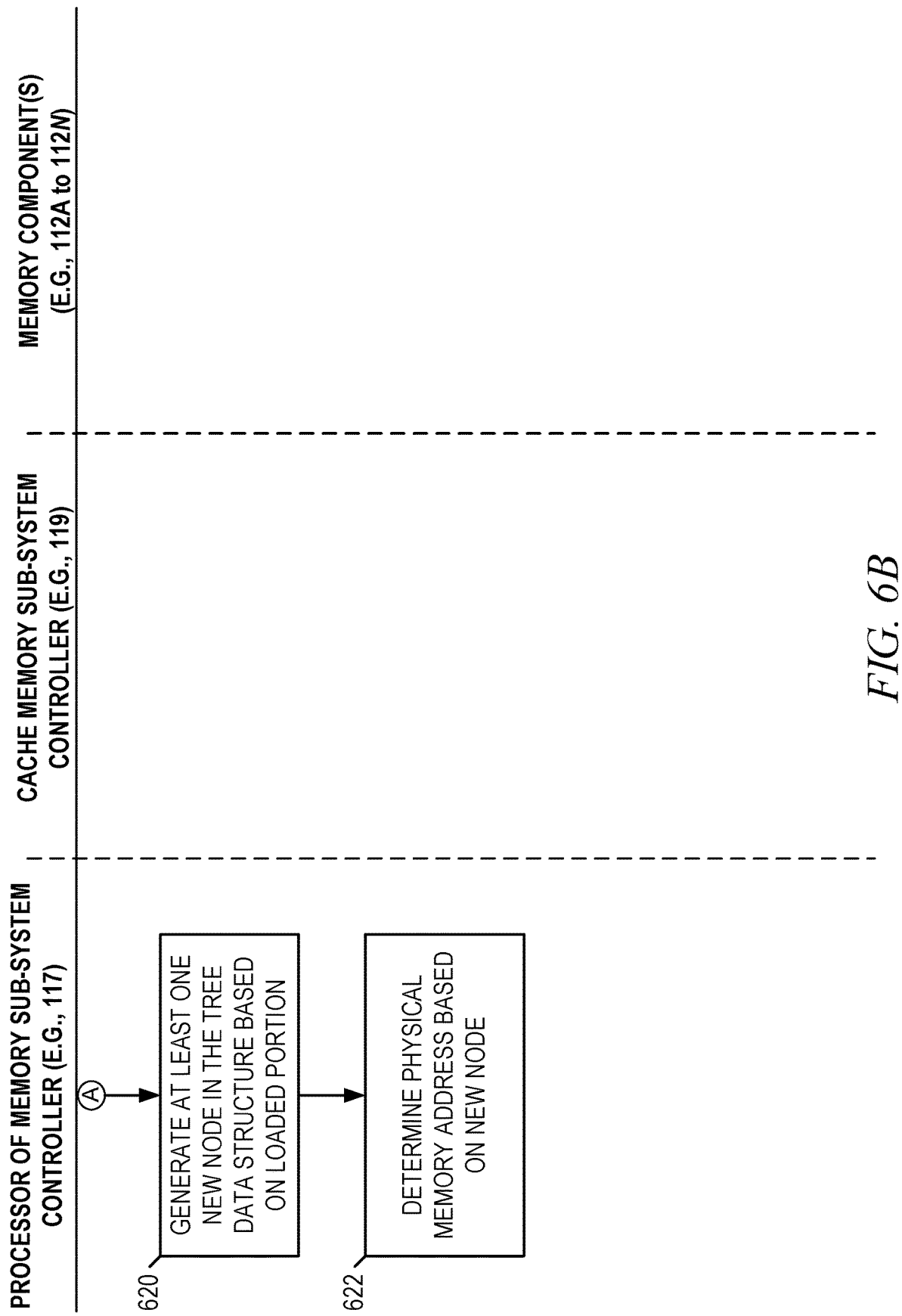

FIGS. 6A and 6B provide an interaction diagram illustrating interactions between components of the computing environment 100 in the context of an example embodiment in which a method is used for using a tree data structure for logical-to-physical memory address mapping. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 6A and 6B, the processor can comprise the processor 117 of the memory sub-system 110, the cache memory can be a part of the memory sub-system controller 115 (such as part of the local memory 119), and the one or more memory components may comprise at least one of the memory components 112A to 112N.

As shown, at operation 602, the processor of the memory sub-system generates a tree data structure for caching, from non-volatile memory implemented by the memory components, a portion of mapping data, where the mapping data maps a set of logical memory addresses to a corresponding set of physical memory addresses of the non-volatile memory. At operation 610, the cache memory stores the tree data structure generated as the processor writes the tree data structure to the cache memory.

At operation 604, the processor searches the tree data structure for (in order to identify) a particular node of the tree data structure that comprises a mapping between a particular logical memory address and a particular (target) physical memory address of the non-volatile memory. As noted herein, operation 604 may be performed in response to a memory command (e.g., write or read command) received by the memory sub-system from a host system (not shown). As the processor searches the tree data structure, the tree data structure reads the tree data structure from the cache memory. At operation 612, the cache memory provides the processor access to the tree data structure. If the particular node is found (identified) in the tree data structure at operation 604, at operation 606, the processor determines the particular physical memory address based on the particular node.

If the particular node is not found (not identified) in the tree data structure at operation 604, at operation 608, the processor loads (e.g., reads) a particular portion of mapping data from the non-volatile memory implemented by the memory components, where the particular portion is associated with the particular logical memory address. The particular portion may be loaded to a local memory accessible to the processor but separate from the cache memory. At operation 614, the memory components provide the processor access to the particular portion as it is read by the processor from the memory components.

At operation 620, the processor generates at least one new node in the tree data structure based on the particular portion of mapping data loaded by the processor at operation 608. Subsequently, at operation 622, the processor determines the particular physical memory address based on the at least one new node generated by the processor at operation 620.

Figure 7:
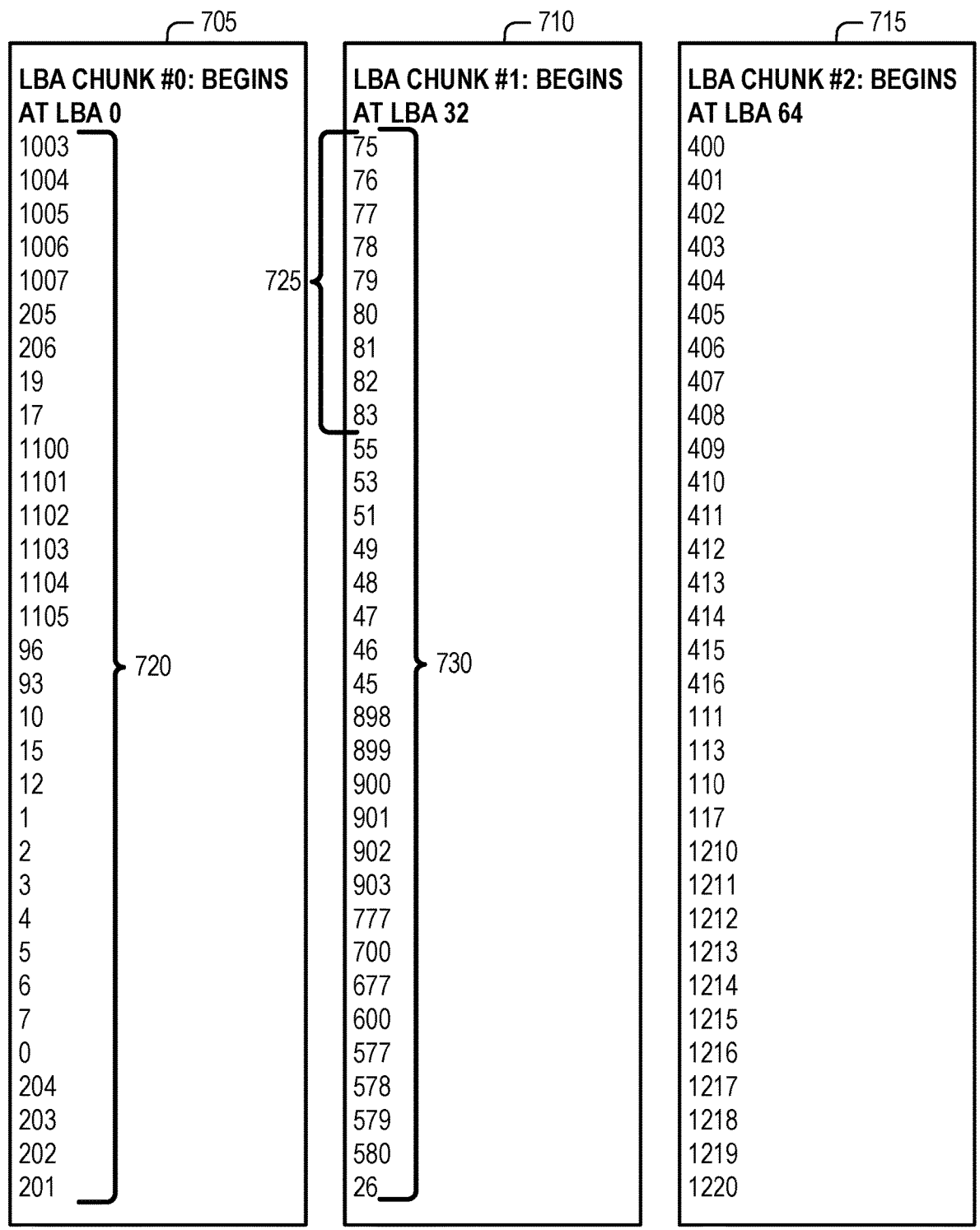
FIGS. 7 through 9 illustrating an example tree data structure having example nodes generated based on portions of example mapping data, in accordance with some implementations of the present disclosure.
Figure 8:
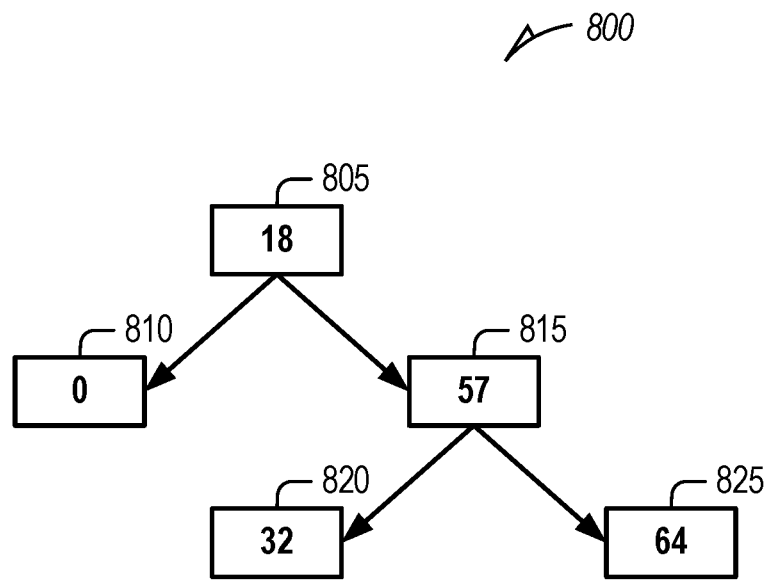
Figure 9:
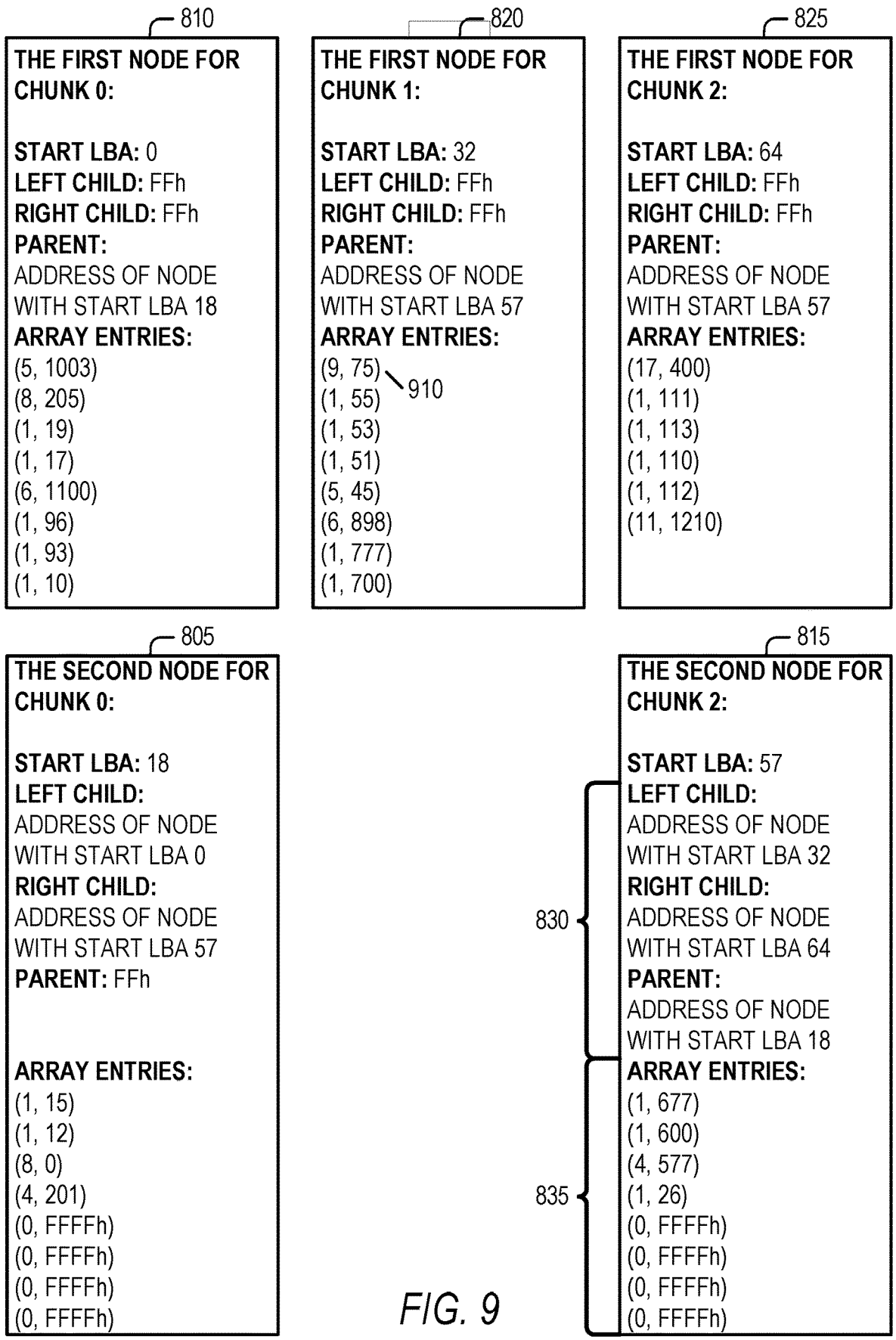

FIGS. 7 through 9 illustrate an example tree data structure having example nodes generated based on portions of example mapping data, in accordance with some implementations of the present disclosure. In particular, FIG. 7 illustrates portions 705, 710, 715 (chunks #0, #1, #2) of example mapping data. As shown, the portion 705 has a starting LBA of 0, the portion 710 has a starting LBA of 32, and the portion 715 has a starting LBA of 64. Each of the portions comprises a flat array of physical memory addresses; as illustrated with respect to the portion 705, the portion 705 comprises an array 720 of physical memory addresses. With respect to the portion 710, reference 725 highlights a contiguous sequence of physical memory addresses stored by an array 730 of the portion 710.

Referring now to FIG. 8, FIG. 8 illustrates an example tree data structure 800. As illustrated, the tree data structure 800 comprises a root node 805, child nodes 810 and 815 of the root node 805, and child nodes 820 and 825 of the node 815. The node 805 has a starting LBA of 18, the node 810 has a starting LBA of 0, the node 815 has a starting LBA of 57, the node 820 has a starting LBA of 32, and the node 825 has a starting LBA of 64.

Referring now to FIG. 9, FIG. 9 illustrates example data of the nodes 805, 810, 815, 820, 825 of the tree data structure 800 generated from the portions 705, 710, 715 of mapping data. As illustrated, the node 810 is the first node generated based on the portion 705 (chunk #0), the node 805 is the second node generated based on the portion 705 (chunk #0), the node 820 is the first node generated based on the portion 710 (chunk #1), the node 825 is the first node generated based on the portion 715 (chunk #2), and the node 815 is the second node generated based on the portion 715 (chunk #2). Each node comprises a starting logical memory address (e.g., start LBA), pointers to a parent node and children node (e.g., 830), and an array (e.g., 835) for storing pairs of a count value and a starting physical memory address. As noted herein, for a given array entry (e.g., (9, 75) of first array entry 910 for the node 820), the count value (e.g., 9) of the given array entry represents how many contiguous physical memory addresses, starting from the starting physical memory address (e.g., 75), the given array entry represents. As shown, the node comprises an array of 8 array entries. Additionally, each node comprises a pointer to a left child node and a pointer to a right child node, which indicates that the tree data structure 800 is a binary tree. As noted herein, for some embodiments, a tree data structure may comprise nodes having more than two child nodes.

Within the nodes, the hex value of FF (FFh) and FFFF (FFFFh) is used as a special value to indicate an empty pointer.

Using basic math, a particular physical memory address can be determined based on the starting LBA of a particular node, the count values stored within the array entries of the array of the particular node, and the starting physical memory addresses stored within the array entries of the array of the particular node. For example, using the tree data structure 800 to map an LBA of 39 to a physical memory address may be performed as follows. For this example, it will be assumed that the tree data structure 800 is already populated with one or more nodes based on the portion 710 (chunk #1) of mapping data, which is associated with a starting LBA of 32 and covers the mapping of the LBA of 39. Starting from the root node 805 of the tree data structure 800, a search process will search for a particular node that covers mapping of the LBA of 39. Since the root node 805 does not cover the LBA of 39, and since the LBA of 39 is greater than the starting LBA (18) of the root node 805, the search process traverses to the right child node: the node 815. Next, since the node 815 does not cover the LBA of 39, and since the LBA of 39 is less than the starting LBA (57) of the node 815, the search process traverses to the left child node: the node 820. The search process determines that the node 820 has a starting LBA of 32 and comprises node data that covers the mapping for the LBA of 39. Based on determining the first array entry of the node 820 is (9, 75), and the last LBA represented by this first array entry (i.e., 32+9=LBA of 41) is greater than the LBA of 39, the search process determines that the first array entry covers the mapping of the LBA of 39. Using the first array entry, an address determination process can determine that the LBA of 39 maps to the physical memory address of 82 based on the first array entry according to the following: 39−32=7, and the $7^{th}$ sequential physical memory address represented by the first array entry maps to physical memory address 82.

Figure 10:
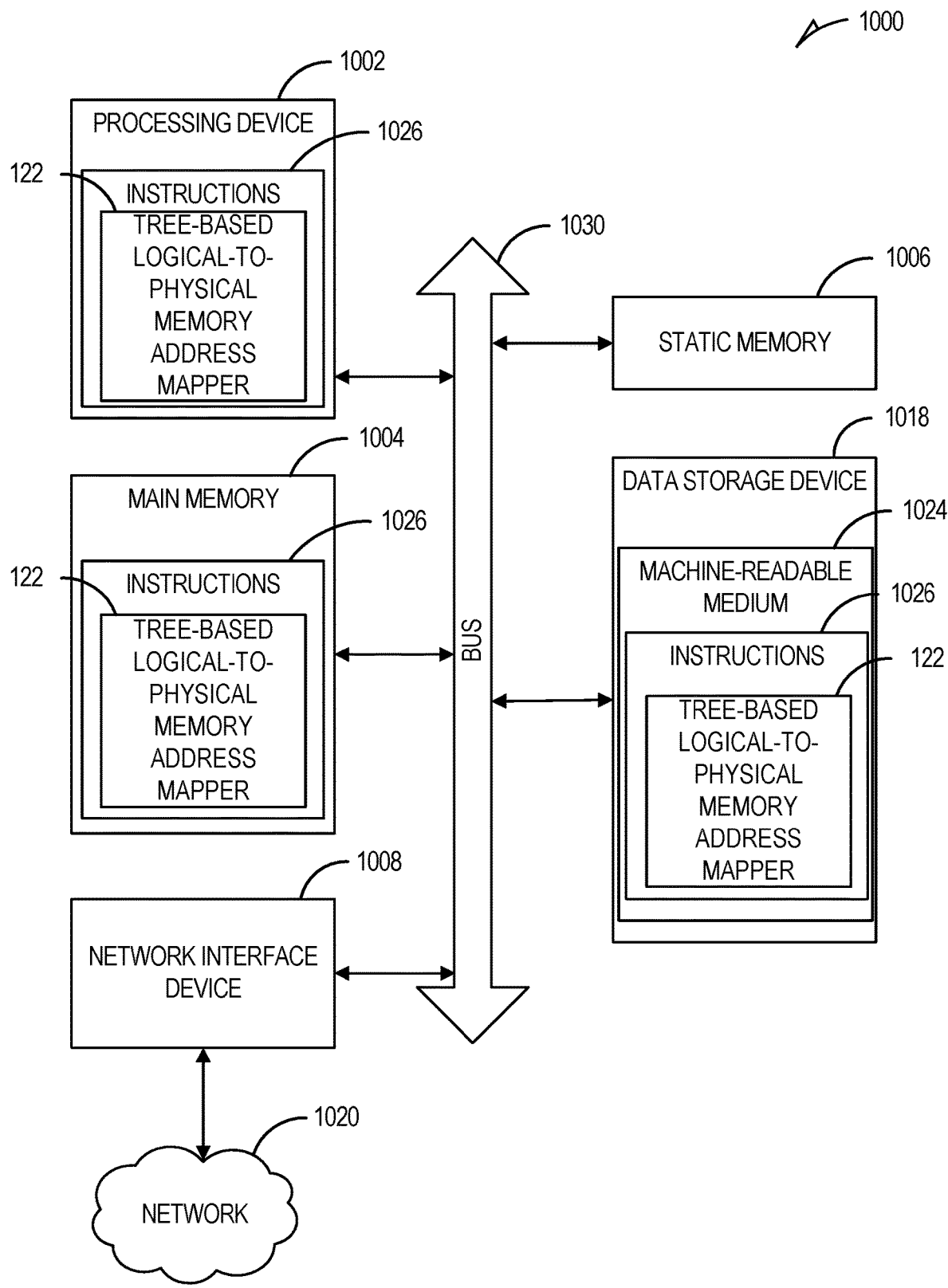
FIG. 10 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the tree-based logical-to-physical memory address mapper 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application specific integrated circuit (ASIC), a field programmable gate array (FPGA), a digital signal processor (DSP), a network processor, or the like. The processing device 1002 is configured to execute instructions 1026 for performing the operations and steps discussed herein. The computer system 1000 can further include a network interface device 1008 to communicate over a network 1020.

The data storage device 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage device 1018, and/or main memory 1004 can correspond to the memory sub-system 110 of FIG. 1.

In one embodiment, the instructions 1026 include instructions to implement functionality corresponding mapping logical memory addresses to physical memory addresses using a tree data structure (e.g., the tree-based logical-to-physical memory address mapper 122 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from other embodiments of the disclosure as set forth in the following claims. The specification and drawings are, accordingly, to be regarded in an illustrative sense rather than a restrictive sense.

EXAMPLES

Example 1 is a method comprising: receiving, by a memory sub-system controller, a memory command from a host system, the memory command being associated with a particular logical memory address; searching, by the memory sub-system controller, for a particular node in a tree data structure stored on cache memory, the particular node comprising a mapping between the particular logical memory address and a particular physical memory address of non-volatile memory, a node of the tree data structure comprising node data that describes a memory area of the non-volatile memory where data is written across a sequence of contiguous physical memory addresses of the non-volatile memory, and the non-volatile memory being implemented by a set of memory components separate from the cache memory; determining, by the memory sub-system controller, the particular physical memory address for the particular logical memory address based on the identified particular node; and executing, by the memory sub-system controller, the memory command based on the determined particular physical memory address.

In Example 2, the subject matter of Example 1 optionally includes where the node data comprises a starting logical memory address represented by the node.

In Example 3, the subject matter of Example 1 or Example 2 optionally includes where the node data comprises an array data structure, the array data structure comprising at least one array entry representing the sequence of contiguous physical memory addresses of the non-volatile memory device, the at least one array entry comprising a starting physical memory address of the sequence of contiguous physical memory addresses, and the at least one array entry further comprising a count value for how many contiguous physical memory addresses are included in the sequence of contiguous physical memory addresses.

In Example 4, the subject matter of any one of Examples 1 to 3 optionally includes where the searching the tree data structure to identify the particular node of the tree data structure that is associated with the particular logical memory address comprises: traversing the tree data structure, in order from a root node of the tree data structure, to identify the particular node in the tree data structure.

In Example 5, the subject matter of any one of Examples 1 to 4 optionally includes where the searching the tree data structure to identify the particular node of the tree data structure that is associated with the particular logical memory address further comprises: in response to identifying the particular node, returning the particular node as the identified particular node.

In Example 6, the subject matter of any one of Examples 1 to 5 optionally includes where the searching the tree data structure to identify the particular node of the tree data structure that is associated with the particular logical memory address further comprises: in response to not identifying the particular node: loading, from the non-volatile memory, a particular portion of mapping data, the particular portion comprising a mapping between the particular logical memory address to the particular physical memory address; generating at least one new node in the tree data structure based on the loaded particular portion of the mapping data, the at least one new node comprising the particular node; and returning the at least one new node as the identified particular node.

In Example 7, the subject matter of any one of Examples 1 to 6 optionally includes where the generating the at least one new node in the tree data structure based on the loaded particular portion of the mapping data comprises: generating a new node in a set of new nodes, the new node comprising new node data that comprises an array data structure and a starting logical memory address; iterating over a plurality of physical memory addresses, stored in the loaded particular portion, to: determine a set of sequences of contiguous physical memory addresses in the plurality of physical memory addresses; and for each particular sequence in the set of sequences of contiguous physical memory addresses, populate an array entry of the array data structure to represent the particular sequence of contiguous physical memory addresses; and inserting the set of new nodes into the tree data structure.

In Example 8, the subject matter of any one of Examples 1 to 7 optionally includes where the generating the at least one new node in the tree data structure based on the loaded particular portion of the mapping data further comprises: determining whether the array data structure ever becomes full while populating array entries of the array data structure to represent particular sequences of contiguous physical memory addresses; and in response to determining that the array data structure has become full while populating the array entries, generating a second new node in the set of new nodes, the second new node comprising second new node data that comprises a second array data structure and a second starting logical memory address represented by the second new node, the second starting logical memory address being different from the starting logical memory address of the new node.

In Example 9, the subject matter of any one of Examples 1 to 8 optionally includes where the tree data structure comprises a binary tree data structure.

In Example 10, the subject matter of any one of Examples 1 to 9 optionally includes where the tree data structure stores at least one portion of mapping data that maps a set of logical memory addresses to a corresponding set of physical memory addresses of the non-volatile memory, and the at least one portion of mapping data is read from the non-volatile memory.

In Example 11, the subject matter of any one of Examples 1 to 10 optionally includes where the at least one portion of the mapping data comprises a starting logical memory address mapped by the portion, and the mapping data further comprises an array of physical memory addresses mapped by the portion.

In Example 11, the subject matter of any one of Examples 1 to 10 optionally includes where the set of memory components comprises a set of NAND-type memory devices.

In Example 12, the subject matter of any one of Examples 1 to 11 optionally includes inserting, by the memory sub-system controller, a set of new nodes into the tree data structure based on a starting logical memory address represented by each particular new node in the set of new nodes, the set of new nodes being inserted into the tree data structure such that the tree data structure resulting after the insert continues to adhere to the following: each left child node is associated with a logical memory address that is less than a parent node of the left node; and each right child node is associated with a logical memory address that is more than a parent node of the right node.

In Example 13, the subject matter of any one of Examples 1 to 12 optionally includes performing, by the memory sub-system controller, garbage collection on a given data block of the non-volatile memory associated with a given logical memory address comprises: moving valid data from the given data block to another data block of the non-volatile memory; searching for a set of nodes, in the tree data structure, each node in the set of nodes being associated with a sequence of logical memory addresses that includes the given logical memory address; copying valid data from one or more data blocks, associated with logical memory addresses in the sequence of logical memory addresses other than the given logical memory address, to the other data block; and replacing the set of nodes in the tree data structure with a single node in the tree data structure.

In Example 14, the subject matter of any one of Examples 1 to 13 optionally includes copying, by the memory sub-system controller, the tree data structure from the cache memory to the non-volatile memory as at a checkpoint time to produce a copy of the tree data structure on the non-volatile memory.

In Example 15, the subject matter of any one of Examples 1 to 14 optionally includes determining, by the memory sub-system controller, whether a memory sub-system suffered an unexpected power loss, the memory sub-system comprising the memory sub-system controller; and in response to determining that the memory sub-system suffered the unexpected power loss, reconstructing, by the memory sub-system controller, a version of the tree data structure on the cache memory based on the copy of the tree data structure on the non-volatile memory.

In Example 16, the subject matter of any one of Examples 1 to 15 optionally includes where the memory command comprises a write command, and the method further comprises: determining, by the memory sub-system controller, whether the particular node should be updated based on the write command; and in response to determining that the particular node should be updated based on the write command: splitting the particular node into at least two children nodes of a same parent node of the particular node; and insert a new child node of the same parent node associated with the write command.

Example 17 is a system comprising: a set of memory components; and a processing device, operatively coupled to the set of memory components, configured to perform operations comprising: searching a tree data structure, stored on cache memory, to identify a particular node of the tree data structure that describes a mapping between a particular logical memory address and a particular physical memory address of non-volatile memory, the non-volatile memory being implemented by a set of memory components separate from the cache memory; in response to not identifying the particular node: loading, from the non-volatile memory, a particular portion of mapping data, the particular portion comprising a mapping between the particular logical memory address to the particular physical memory address; generating at least one new node in the tree data structure based on the loaded particular portion of the mapping data, the at least one new node comprising the particular node; and returning the at least one new node as the identified particular node; and determining the particular physical memory address for the particular logical memory address based on the identified particular node.

In Example 18, the subject matter of Example 17 optionally includes where the generating the at least one new node in the tree data structure based on the loaded particular portion of the mapping data comprises: generating a new node in a set of new nodes, the new node comprising new node data that comprises an array data structure and a starting logical memory address; iterating over a plurality of physical memory addresses, stored in the loaded particular portion, to: determine a set of sequences of contiguous physical memory addresses in the plurality of physical memory addresses; and for each particular sequence in the set of sequences of contiguous physical memory addresses, populate an array entry of the array data structure to represent the particular sequence of contiguous physical memory addresses; and inserting the set of new nodes into the tree data structure.

In Example 19, the subject matter of Examples 17 or Example 18 optionally includes where the generating the at least one new node in the tree data structure based on the loaded particular portion of the mapping data further comprises: determining whether the array data structure ever becomes full while populating array entries of the array data structure to represent particular sequences of contiguous physical memory addresses; and in response to determining that the array data structure has become full while populating the array entries, generating a second new node in the set of new nodes, the second new node comprising second new node data that comprises a second array data structure and a second starting logical memory address represented by the second new node, the second starting logical memory address being different from the starting logical memory address of the new node.

Example 20 is a system comprising: local memory that comprises a cache memory; and a processing device, operatively coupled to the local memory, configured to perform operations comprising: generating a tree data structure on the cache memory to cache, from non-volatile memory, at least one portion of mapping data, the mapping data mapping a set of logical memory addresses to a corresponding set of physical memory addresses of the non-volatile memory, a node of the tree data structure comprising node data that comprises a memory area of the non-volatile memory where data is written across a sequence of contiguous physical memory addresses of the non-volatile memory, and the non-volatile memory being implemented by a set of memory components separate from cache memory; searching the tree data structure to identify a particular node of the tree data structure that comprises a mapping between a particular logical memory address and a particular physical memory address of the non-volatile memory; and determining the particular physical memory address for the particular logical memory address based on the identified particular node.

The invention claimed is:

1. A method comprising:
receiving, by a memory sub-system controller, a memory command from a host system, the memory command being associated with a particular logical memory address; and
in response to receiving the memory command:
searching, by the memory sub-system controller, to identify a particular node in a tree data structure stored on cache memory, the particular node comprising a mapping between the particular logical memory address and a particular physical memory address of non-volatile memory, a node of the tree data structure comprising node data that describes a memory area of the non-volatile memory where data is written across a sequence of contiguous physical memory addresses of the non-volatile memory, and the non-volatile memory being implemented by a set of memory components separate from the cache memory, the searching comprising, in response to not identifying the particular node:
loading, from the non-volatile memory, a particular portion of mapping data, the particular portion comprising a mapping between the particular logical memory address to the particular physical memory address; and
generating at least one new node in the tree data structure based on the loaded particular portion of the mapping data, the at least one new node comprising the particular node, the at least one new node comprising an array data structure, the generating the at least one new node comprising iterating over a plurality of physical memory addresses, stored in the loaded particular portion, to populate a given array entry of the array data structure to represent the particular sequence of contiguous physical memory addresses;
determining, by the memory sub-system controller, the particular physical memory address for the particular logical memory address based on the identified particular node; and
executing, by the memory sub-system controller, the memory command based on the determined particular physical memory address.

2. The method of claim 1, wherein the node data comprises a starting logical memory address represented by the node.

3. The method of claim 1, wherein the node data comprises another array data structure, the other array data structure comprising at least one array entry representing the sequence of contiguous physical memory addresses of the non-volatile memory device, the at least one array entry comprising a starting physical memory address of the sequence of contiguous physical memory addresses, and the at least one array entry further comprising a count value for how many contiguous physical memory addresses are included in the sequence of contiguous physical memory addresses.

4. The method of claim 1, wherein the searching the tree data structure to identify the particular node of the tree data structure that associated with the particular logical memory address further comprises:
traversing the tree data structure, in order from a root node of the tree data structure, to identify the particular node in the tree data structure.

5. The method of claim 4, wherein the searching the tree data structure to identify the particular node of the tree data structure that associated with the particular logical memory address further comprises:
in response to identifying the particular node, returning the particular node as the identified particular node.

6. The method of claim 1, wherein the generating the at least one new node in the tree data structure based on the loaded particular portion of the mapping data comprises:
generating a new node in a set of new nodes, the new node comprising new node data that comprises the array data structure and a starting logical memory address, the iterating over the plurality of physical memory addresses comprising:
determining a set of sequences of contiguous physical memory addresses in the plurality of physical memory addresses; and
for each particular sequence in the set of sequences of contiguous physical memory addresses, populating an array entry of the array data structure to represent the particular sequence of contiguous physical memory addresses; and
inserting the set of new nodes into the tree data structure.

7. The method of claim 6, wherein the generating the at least one new node in the tree data structure based on the loaded particular portion of the mapping data further comprises:

determining whether the array data structure ever becomes full while populating array entries of the array data structure to represent particular sequences of contiguous physical memory addresses; and in response to determining that the array data structure has become full while populating the array entries, generating a second new node in the set of new nodes, the second new node comprising second new node data that comprises a second array data structure and a second starting logical memory address represented by the second new node, the second starting logical memory address being different from the starting logical memory address of the new node.

8. The method of claim 1, wherein the tree data structure comprises a binary tree data structure.

9. The method of claim 1, wherein the tree data structure stores at least one portion of mapping data that maps a set of logical memory addresses to a corresponding set of physical memory addresses of the non-volatile memory, the at least one portion of mapping data being read from the non-volatile memory.

10. The method of claim 9, wherein the at least one portion of the mapping data comprises a starting logical memory address mapped by the portion, and the mapping data further comprises an array of physical memory addresses mapped by the portion.

11. The method of claim 1, further comprising:
inserting, by the memory sub-system controller, a set of new nodes into the tree data structure based on a starting logical memory address represented by each particular new node in the set of new nodes, the set of new nodes being inserted into the tree data structure such that the tree data structure resulting after the insert adheres to the following:
each left child node is associated with a logical memory address that is less than a logical memory address associated with a parent node of the left node; and
each right child node is associated with a logical memory address that is more than a logical memory address associated with a parent node of the right node.

12. The method of claim 1, further comprising:
performing, by the memory sub-system controller, garbage collection on a given data block of the non-volatile memory associated with a given logical memory address comprises:
copying valid data from the given data block to another data block of the non-volatile memory;
searching for a set of nodes, in the tree data structure, each node in the set of nodes being associated with a sequence of logical memory addresses that includes the given logical memory address;
copying valid data from one or more data blocks, associated with logical memory addresses in the sequence of logical memory addresses other than the given logical memory address, to the other data block; and
replacing the set of nodes in the tree data structure with a single node in the tree data structure.

13. The method of claim 1, further comprising:
copying, by the memory sub-system controller, the tree data structure from the cache memory to the non-volatile memory as at a checkpoint time to produce a copy of the tree data structure on the non-volatile memory.

14. The method of claim 13, further comprising:
determining, by the memory sub-system controller, whether a memory sub-system suffered an unexpected power loss, the memory sub-system comprising the memory sub-system controller; and
in response to determining that the memory sub-system suffered the unexpected power loss, reconstructing, by the memory sub-system controller, a version of the tree data structure on the cache memory based on the copy of the tree data structure on the non-volatile memory.

15. The method of claim 1, wherein the memory command comprises a write command, and the method further comprises:
determining, by the memory sub-system controller, whether the particular node should be updated based on the write command; and
in response to determining that the particular node should be updated based on the write command:
splitting the particular node into at least two children nodes of a same parent node of the particular node; and
insert a new child node of the same parent node associated with the write command.

16. A system comprising:
a set of memory components; and
a processing device, operatively coupled to the set of memory components, configured to perform operations comprising:
searching a tree data structure, stored on cache memory, to identify a particular node of the tree data structure that describes a mapping between a particular logical memory address and a particular physical memory address of non-volatile memory, the non-volatile memory being implemented by a set of memory components separate from the cache memory;
in response to not identifying the particular node:
loading, from the non-volatile memory, a particular portion of mapping data, the particular portion comprising a mapping between the particular logical memory address to the particular physical memory address; and
generating at least one new node in the tree data structure based on the loaded particular portion of the mapping data, the at least one new node comprising the particular node, the at least one new node comprising an array data structure, the generating the at least one new node comprising iterating over a plurality of physical memory addresses, stored in the loaded particular portion, to populate a given array entry of the array data structure to represent the particular sequence of contiguous physical memory addresses; and
determining the particular physical memory address for the particular logical memory address based on the identified particular node.

17. The system of claim 16, wherein the generating the at least one new node in the tree data structure based on the loaded particular portion of the mapping data comprises:
generating a new node in a set of new nodes, the new node comprising new node data that comprises the array data structure and a starting logical memory address the iterating over the plurality of physical memory addresses comprising:

determining a set of sequences of contiguous physical memory addresses in the plurality of physical memory addresses; and for each particular sequence in the set of sequences of contiguous physical memory addresses, populating an array entry of the array data structure to represent the particular sequence of contiguous physical memory addresses; and inserting the set of new nodes into the tree data structure.

18. The system of claim 17, wherein the generating the at least one new node in the tree data structure based on the loaded particular portion of the mapping data further comprises:

determining whether the array data structure ever becomes full while populating array entries of the array data structure to represent particular sequences of contiguous physical memory addresses; and in response to determining that the array data structure has become full while populating the array entries, generating a second new node in the set of new nodes, the second new node comprising second new node data that comprises a second array data structure and a second starting logical memory address represented by the second new node, the second starting logical memory address being different from the starting logical memory address of the new node.

19. A system comprising:

local memory that comprises a cache memory; and a processing device, operatively coupled to the local memory, configured to perform operations comprising:

generating a tree data structure on the cache memory to cache, from non-volatile memory, at least one portion of mapping data, the mapping data mapping a set of logical memory addresses to a corresponding set of physical memory addresses of the non-volatile memory, a node of the tree data structure comprising node data that comprises a memory area of the non-volatile memory where data is written across a sequence of contiguous physical memory addresses of the non-volatile memory, and the non-volatile memory being implemented by a set of memory components separate from cache memory;

searching the tree data structure to identify a particular node of the tree data structure that comprises a mapping between a particular logical memory address and a particular physical memory address of the non-volatile memory, the searching comprising, in response to not identifying the particular node:

loading, from the non-volatile memory, a particular portion of mapping data, the particular portion comprising a mapping between the particular logical memory address to the particular physical memory address; and generating at least one new node in the tree data structure based on the loaded particular portion of the mapping data, the at least one new node comprising the particular node, the at least one new node comprising an array data structure, the generating the at least one new node comprising iterating over a plurality of physical memory addresses, stored in the loaded particular portion, to populate a given array entry of the array data structure to represent the particular sequence of contiguous physical memory addresses; and determining the particular physical memory address for the particular logical memory address based on the identified particular node.

\* \* \* \* \*